No. 683,525. Patented Oct. 1, 1901.
H. A. TUTTLE.
FRICTION CLUTCH.
(Application filed Dec. 18, 1900.)
(No Model.)
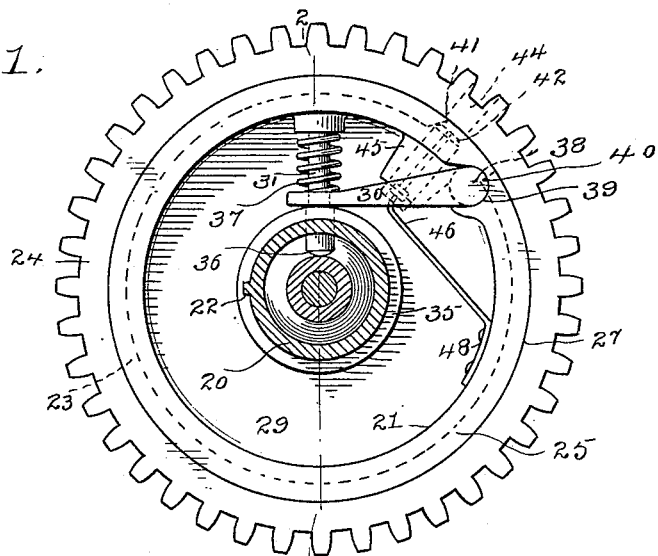
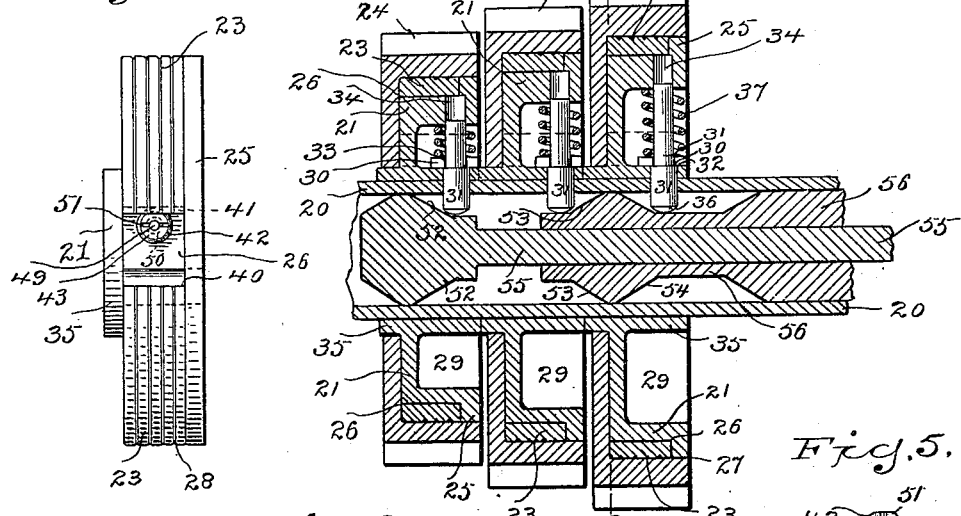
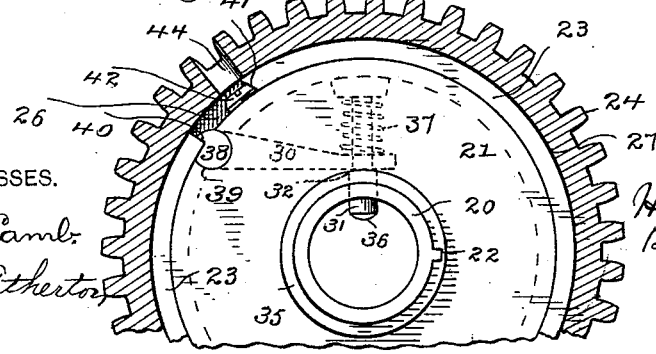
WITNESSES.
H. A. Lamb.
S. W. Atherton.
INVENTOR.
Henry A. Tuttle
By
A. M. Wooster
Atty.

UNITED STATES PATENT OFFICE.

HENRY A. TUTTLE, OF STAMFORD, CONNECTICUT.

FRICTION-CLUTCH.

SPECIFICATION forming part of Letters Patent No. 683,525, dated October 1, 1901.

Application filed December 18, 1900. Serial No. 40,295. (No model.)

*To all whom it may concern:*

Be it known that I, HENRY A. TUTTLE, a citizen of the United States, residing at Stamford, county of Fairfield, State of Connecticut, have invented a new and useful Friction-Clutch, of which the following is a specification.

My invention has for its object to provide a friction-clutch adapted for general use, as in connection with shafting, and to run independent machines or different parts of the same machine, also to various uses where two, three, or more speeds may be required, as in gas-engines and in motor-vehicles generally.

In order to accomplish the desired result, I have devised the novel friction-clutch which I will now describe, referring to the accompanying drawings, forming part of this specification, and using reference characters to designate the several parts.

For convenience in illustration I have shown my invention as applied in connection with three gear-wheels. It should be understood, however, that my invention is equally adapted to structures comprising two, four, or any practicable number of wheels and that it is just as applicable in connection with belt-wheels as with gear-wheels. For this reason I shall speak of the gear-wheels shown in the drawings as "driving-wheels."

Figure 1 is an elevation as seen from the right in Fig. 2, the shaft and cam operating connections being in section; Fig. 2, a section on the line 2 2 in Fig. 1; Fig. 3, a section on the line 3 3 in Fig. 2 looking toward the right; Fig. 4, a plan view of a clutch-ring and carrying-wheel removed, and Fig. 5 is a detail sectional view of one of the clutch-ring tension-screws.

20 denotes a hollow shaft, to which any required number of carrying-wheels 21 may be independently attached in any suitable manner, as by a spline-and-groove connection, as at 22 in Fig. 1.

23 denotes the clutch-rings, which are resilient, and 24 the driving-wheels.

As the construction of each driving-wheel and the corresponding carrying-wheel, clutch-ring, and connections is the same as all the others, I will for the sake of convenience and clearness of description describe but one of the driving-wheels. Each carrying-wheel is provided on its face with a radial flange 25 and back of the flange with a recess 26, which receives the clutch-ring. The driving-wheel is loose on the shaft and is provided with a recess 27, which receives the carrying-wheel and the clutch-ring, as clearly shown in Fig. 2, the driving-wheel being shown as passed from the rear over the carrying-wheel and the clutch-ring and receiving said carrying-wheel and clutch-ring loosely enough so that when the clutch-ring is not expanded the shaft, carrying-wheel, and clutch-ring will turn freely within the driving-wheel and without imparting motion to the latter. The periphery of the clutch-ring is shown as provided with grooves 28, which may or may not be used, as preferred.

29 denotes a recess in the inner face of each carrying-wheel. Within this recess is an operating-lever 30, which is itself operated by means of a plunger 31, having a shoulder 32, upon which the operating-lever rests. The shank of the plunger passes through a slot 33 in the operating-lever and extends outward radially and terminates in a hole 34 in the periphery of the carrying-wheel, whereby it is steadied. The head of the plunger extends through the hub 35 of the carrying-wheel and through the hollow shaft and is provided with a rounded end 36, which is engaged by an operating-cam, as will be more fully explained. The operating-lever and the plunger are retained in the inoperative position by means of a spring 37, which is shown as surrounding the plunger and bearing against the operating-lever and the inner periphery of the carrying-wheel. At the outer end of the operating-lever is a hub 38, which lies in a transverse socket 39 in the periphery of the carrying-wheel, through which it extends. (See Figs. 1 and 3, which show the opposite ends of the hub.) In the outer face of hub 38 is a recess 40, which receives one end of the clutch-ring, as clearly shown in Fig. 3, the other end of the clutch-ring being an undercut incline 41, which is engaged by the correspondingly-inclined head 42 of a tension-screw 43. The head of this tension-screw lies in an opening between the ends of the clutch-ring and may be operated by means of a screw-driver passed through a hole 44 in the periphery of the driving-wheel. (See Fig. 3.) The body of the tension-screw engages a hub 45 upon the inner periphery of the carrying-wheel. (See Fig. 1.) The tension-screw is shown as locked in place after the tension of the clutch-ring has been adjusted by means of a spring-catch 46, which engages a slot 47 in the inner end of tension-screw 43. In the present instance the catch consists simply of a spring rigidly secured to the inner periphery of the carrying-wheel, as at 48, and having its free end turned at a suitable angle to engage slot 47. The spring-catch is disengaged from slot 47 by means of a plunger 49, lying in a central opening in the tension-screw and provided with a head 50, lying in a correspondingly-shaped recess at the base of slot 47, the shank of the plunger extending upward above the base of the slot 51 in the head 42 of the tension-screw.

The operation of adjusting the tension of the clutch-ring is as follows: The operator passes a screw-driver through hole 44 in the periphery of the driving-wheel and engages slot 51 in the head of the tension-screw, the screw-driver at the same time engaging the end of the shank of the plunger and pushing the plunger down, which causes the head of the plunger to force spring-catch 46 out of slot 47 in the base of the tension-screw. This leaves the tension-screw free to be rotated in either direction by the screw-driver, it being obvious from Fig. 3 that if the tension-screw is turned outward the engagement of the head of the tension-screw with incline 41 upon the clutch-ring will tighten the tension of the latter and that if the tension-screw is turned inward the effect will be to loosen the tension of the clutch-ring, which will contract through its own resiliency. Having effected the adjustment of the clutch-ring, the tension-screw is locked in place by engagement of the spring-catch with slot 47, the spring-catch acting to force the head of the plunger into the socket and to lift the shank of the plunger upward into slot 51 in the head of the tension-screw.

The clutch-rings are expanded to lock the driving-wheels to the carrying-wheels by means of cams which engage the heads of plungers 31. For convenience in description I designate the cam which operates the clutch-ring in the left driving-wheel by 52, the cam which operates the clutch-ring in the central driving-wheel by 53, and the cam which operates the clutch-ring in the right driving-wheel by 54. These cams are operated by suitable connections. In the present instance I have shown cam 52 as carried by a reciprocating rod 55, and cams 53 and 54 as both carried by a reciprocating sleeve 56. It is of course wholly immaterial, so far as the principle of my invention is concerned, how the cam-operating connections are themselves operated. In the drawings the parts are shown in the inoperative position—that is, a position in which the clutch-rings are not expanded and the carrying-wheels turn freely within the driving-wheels, the driving-wheels, however, remaining stationary. Suppose, now, that it is desired to impart motion to the left driving-wheel. The left cam 52 would be moved toward the right by means of its connection, and the rounded head of the corresponding plunger 31 would be caused to ride up the incline. The plunger, through the engagement of shoulder 32 with the operating-lever, would lift the inner end of the latter slightly, oscillating the hub 38 and causing the wall of recess 40 in said hub, which receives one end of the clutch-ring, to bear against the end of the clutch-ring and move it circumferentially. The other end of the clutch-ring being held against circumferential movement through its engagement with the head of the tension-screw, it follows that the clutch-ring must be expanded—i. e., forced outward—so that it will engage the inner periphery of the driving-wheel and lock the driving-wheel to the carrying-wheel, the driving-wheel and the carrying-wheel remaining locked together, so that the latter will carry the former so long as cam 52 is retained in a position to hold the plunger lifted. The instant the cam is returned to the inoperative position, as shown in the drawings, spring 37 will return the operating-lever and the plunger to the position shown, thereby oscillating hub 38 in the opposite direction and relieving the pressure upon the end of the clutch-ring, so that the resiliency of the latter will cause it to instantly resume its normal position and release the driving-wheel. The operation of connecting and disconnecting the central and the right driving-wheels from the corresponding carrying-wheels is performed in precisely the same manner—i. e., by longitudinal movement of the corresponding cams.

In Fig. 2 I have shown the cams corresponding to the central and right driving-wheels as formed integral and as operated by one connection, which in this instance is a sleeve, it being obvious from Fig. 2 that movement of cam 53 toward the left will lock the central driving-wheel to the corresponding carrying-wheel and the return movement will release it and that movement of cam 54 toward the right will lock the right driving-wheel to the corresponding carrying-wheel and the return movement will release it.

Having thus described my invention, I claim—

1. The combination with a hollow shaft and a plurality of carrying-wheels fixed thereto and provided with resilient clutch-rings, of driving-wheels independent of the shaft and lying outside the carrying-wheels, a reciprocating rod and an independently-reciprocating sleeve within the shaft, cams carried by said rod and said sleeve and mechanism intermediate said cams and the clutch-rings, whereby the clutch-rings may be independently expanded.

2. The combination with a shaft, a fixed carrying-wheel provided with a clutch-ring and a loose driving-wheel lying outside the carrying-wheel, of a reciprocating cam within the shaft, a radial plunger engaging the cam and having a shoulder, an operating-lever having a hub journaled in the periphery of the carrying-wheel and adapted to expand the clutch-ring, the other end of said lever engaging the shoulder on the plunger, and a spring acting to retain the parts in the inoperative position.

3. The combination with a shaft, a fixed carrying-wheel provided with a clutch-ring and having a socket 39 and a loose driving-wheel lying outside the carrying-wheel, of a reciprocating cam within the shaft, a radial plunger engaging the cam and having a shoulder, an operating-lever one end of which is provided with a hub lying in the socket, the other end engaging the shoulder, and a spring acting to retain the plunger and the operating-lever in the inoperative position.

4. The combination with a shaft, a fixed carrying-wheel having a socket 39 and a peripheral resilient clutch-ring, and a loose driving-wheel lying outside the clutch-ring, of a reciprocating cam lying within the shaft, a radial plunger engaging the cam and a spring-controlled operating-lever provided at one end with a hub having a recess to receive an end of the clutch-ring, the other end of said lever being adapted to be engaged by the plunger to expand the clutch-ring.

5. The combination with a shaft, a fixed carrying-wheel provided with a resilient clutch-ring and a loose driving-wheel lying outside the carrying-wheel, of a tension-screw in the carrying-wheel against which one end of the clutch-ring bears, a spring-controlled operating-lever provided at one end with a hub journaled in the carrying-wheel and having a recess to receive the other end of the clutch-ring, a spring-controlled radial plunger and operating mechanism therefor, whereby when said plunger is moved outward against the power of the spring the operating-lever will be oscillated and the clutch-ring expanded to lock the driving-wheel to the carrying-wheel.

6. The combination with a shaft, a fixed carrying-wheel provided with a resilient clutch-ring and a loose driving-wheel lying outside the carrying-wheel and having a hole 44 in its periphery, of a tension-screw in the carrying-wheel registering with hole 44 and against which one end of the clutch-ring bears and mechanism operating upon the other end of the clutch-ring to expand the latter and lock the driving-wheel to the carrying-wheel, the tension of the clutch-ring being regulated by operating the tension-screw through hole 44.

7. The combination with a shaft, a fixed carrying-wheel provided with a resilient clutch-ring and a loose driving-wheel lying outside the carrying-wheel, of a tension-screw in the carrying-wheel against which one end of the clutch-ring bears, an operating-lever having a hub provided with a recess to receive the other end of the clutch-ring, means for oscillating the lever to expand the clutch-ring, a spring-catch for locking the tension-screw after adjustment and a longitudinal plunger in the tension-screw by which the spring-catch may be disengaged.

8. In a structure of the character described the combination with a carrying-wheel provided with a resilient clutch-ring and a loose driving-wheel lying outside the clutch-ring, of mechanism for expanding the clutch-ring to lock the driving-wheel to the carrying-wheel, a screw for adjusting the tension of the clutch-ring, a spring-catch for locking the tension-screw and a plunger socketed in the tension-screw by which the catch may be disengaged.

9. In a structure of the character described the combination with a carrying-wheel provided with a resilient clutch-ring and a loose driving-wheel lying outside the clutch-ring, of mechanism for expanding the clutch-ring to lock the driving-wheel to the carrying-wheel, a screw for adjusting the tension of the clutch-ring, said screw having a longitudinal plunger socketed therein and at its inner end a slot 47 and a spring-catch adapted to engage the slot and to be disengaged therefrom by movement of the plunger.

In testimony whereof I affix my signature in presence of two witnesses.

HENRY A. TUTTLE.

Witnesses:
WM. F. WATERBURY,
F. B. GURLEY.